United States Patent [19]
Strassel

[11] 3,931,115
[45] Jan. 6, 1976

[54] PROCESS OF SPRAYING POLYURETHANE-POLYUREA COMPOSITIONS AND APPLICATIONS THEREOF

[75] Inventor: Albert Pierre Strassel, Ville d'Avray (Hauts-de-Seine), France

[73] Assignee: Societe Anonyoe: Produits Chimiques Ugine Kuhlmann, Paris, France

[22] Filed: Mar. 26, 1973

[21] Appl. No.: 344,617

[30] Foreign Application Priority Data

Apr. 5, 1972 France ..... 72.11953

[52] U.S. Cl... 260/75 NH; 260/31.8 R; 260/32.8 N; 260/33.8 UB; 260/75 NE; 260/858

[51] Int. Cl.[2] ..... C08G 18/28

[58] Field of Search...260/77.5 AN, 75 NE, 77.5 AA, 260/75 NH, 75 NK

[56] References Cited

UNITED STATES PATENTS

| | | | |
|---|---|---|---|
| 3,440,086 | 4/1969 | Kerns | 260/77.5 AA |
| 3,499,858 | 3/1970 | Strassel | 260/77.5 AA |
| 3,509,102 | 4/1970 | Horn et al. | 260/77.5 AN |
| 3,658,761 | 4/1972 | Hostettler et al. | 260/77.5 AN |
| 3,666,724 | 5/1972 | Hostettler | 260/77.5 AN |
| 3,684,770 | 8/1972 | Meisert et al. | 260/77.5 AM |
| 3,705,132 | 12/1972 | Cuscurida | 260/77.5 AN |
| 3,746,665 | 7/1973 | Koleske et al. | 260/77.5 AN |
| 3,784,061 | 1/1974 | Jellinek et al. | 260/75 NK |
| 3,804,810 | 4/1974 | Fryd | 260/75 NH |

*Primary Examiner*—H. S. Cockeram
*Attorney, Agent, or Firm*—Hammond & Littell

[57] ABSTRACT

A polyurethane-polyurea composition is obtained by reacting a liquid prepolymer previously prepared by reaction of one or more polyols having a molecular weight of between 300 and 6000 with a polyisocyanate in excess with a diamine dissolved in a solvent, the said liquid prepolymer containing simultaneously polyester and polyether linkages and, optionally, a solvent.

Application to obtaining resistant films, by spraying the composition by means of a spray gun.

6 Claims, No Drawings

PROCESS OF SPRAYING POLYURETHANE-POLYUREA COMPOSITIONS AND APPLICATIONS THEREOF

The present invention relates to a polyurethane - polyurea composition, notably intended to be used by spraying onto a support.

There has already been described (French Pat. No. 1,427,722) a polyether polyurethane-polyurea composition obtained by reacting a polyether-polyurethane prepolymer previously prepared by reaction of polyether-polyols and polyisocyanates in excess in such a manner that the ratio NCO/OH is between 1.5 and 3 and preferably at least equal to 2, with an aromatic diamine dissolved in a solvent, the proportions of the polyether - polyurethane prepolymer and the diamine reacted being such that the ratio $NH_2$/OH is higher than 0.5 and preferably between 0.5 and 2, and the ratio NCO/OH + $NH_2$ is between about 0.95 and 1.6. Such a composition can notably be applied by spraying to provide a film or coating the thickness of which may range from several tenths of a millimeter to several centimeters.

Although the mechanical properties of the films thus obtained, variable within very broad limits and adaptable to the use to which they are to be put, are generally satisfactory, it appeared necessary in certain cases to improve them in order to make them more compatible with the properties of the support for which they are intended and to improve their performances.

In general, it is known that it is possible to improve the mechanical properties of polyurethanes obtained by the reaction of a polyisocyanate and a polyether-polyol by replacing the latter by a polyester-polyol or certain polyester-polyols.

Unfortunately, especially for the preparation of polyurethane-polyurea compositions applicable by spraying, polyester-polyols cannot be used because the prepolymers which they provide by reaction with a polyisocyanate are almost always solid, even at temperatures of 40°C; at higher temperatures, up to 80°–100° C, they are in the liquid state, but their very high viscosity makes it extremely difficult to spray them and practically impossible to mix them intimately with a sprayed diamine solution.

To avoid these drawbacks, it has already been suggested that the polyester-polyurethane prepolymer should be dissolved in a solvent in order to obtain a solution with a fairly low level of viscosity so that its spraying no longer presents any difficulties. The amount of solvent to be used is important; it is added to the amount of solvent introduced at the same time as the diamine. These large amounts of solvent give rise to serious defects. Firstly, the polyurethane-polyurea film shrinks during drying and, in the case of spraying onto a flexible support (leather, paper, textile . . . ) causes a quite unacceptable deformation of said support. When spraying is effected on a mould of synthetic material, of silicone rubber for example, the solvent causes rapid wearing of the mould. Finally, after spraying, the solvent has to be allowed the time to evaporate, which results in a substantial slowing down of production rates.

The use of polyesters for the preparation of polyurethane-polyurea films has another, more fundamental drawback, which is their poor aging in damp atmosphere because the ester functions present a poor resistance to hydrolysis reactions. This defect does away with many of the advantages attached to the use of said materials in the shoe industry for example, where polyurethane-leather or polyurethane-textile (woven or unwoven) complexes could provide notable technical progress.

As documents illustrating the prior art, U.K. Pat. No. 1,210,737 and U.S. Pat. No. 3,440,086 may also be mentioned.

U.K. Pat. No. 1,210,737 relates to polyurethane coatings applied in the form of a polymer finished in solution in a solvent. It is therefore compulsory for the polymer to be linear and for it to have completely reacted prior to application. This document does not describe the means for obtaining two components intended to be mixed by spraying, because, if the polymer is to be sprayed it must, according to the teaching of U.K. Pat. No. 1,211,737 be dissolved in a solvent.

U.S. Pat. No. 3,440,086 does not describe simultaneous polyester-polyether linkages in the prepolymers and is limited to using particular viscosity additives.

The object of the present invention is a polyurethane polyurea composition making it possible to improve the mechanical properties of coatings realized with compositions obtained from polyether-polyols and avoiding the drawbacks met with when said coatings are realized with compositions obtained from polyester-polyols. It also has as an object a polyurethane-polyurea coating having, simultaneously, polyether and polyester sequences, easy to realize by the spraying technique, using limited amounts of solvent and having good resistance to ageing in a damp atmosphere.

The invention has as an object a polyurethane-polyurea composition, notably intended to be applied by spraying and obtained by reacting a liquid prepolymer previously prepared by reaction of one or more polyols and a polyisocyanate in excess in such a manner that the ratio NCO/OH is between 1.5 and 3, with a diamine dissolved in a solvent, the proportions of the prepolymer and the diamine reacted being such that the ratio $NH_2$/OH is higher than 0.5 and the ratio NCO-/OH + $NH_2$ is between about 0.95 and 1.6, characterized in that the said liquid prepolymer simultaneously contains polyether linkages and polyester linkages and, optionally, a solvent.

More particularly, the present invention has as an object a polyurethane - polyurea composition obtained by bringing into contact an aromatic diamine in a solvent and a polyether - polyurethane prepolymer previously prepared by reaction of polyether-polyols and polyisocyanates in excess in such a manner that the ratio NCO/OH is between about 1.5 and 3, the proportions of the prepolymer and the diamine being such that the ratio $NH_2$/OH is higher than 0.5 and the ratio NCO/OH + $NH_2$ is between about 0.95 and 1.6, the said composition being characterized in that the liquid prepolymer is previously prepared using at least one polyol the molecular weight of which is in the range of 300 to 6000, the said prepolymer simultaneously containing polyester and polyether linkages and, optionally, a solvent, while the diamine is chosen, apart from aromatic diamines, from cycloaliphatic diamines, aliphatic diamines and mixtures thereof one with another or with aromatic diamines.

The invention therefore consists of a polyurethane-polyurea composition obtained by reacting, with a diamine dissolved in a solvent, a liquid prepolymer previously prepared by reaction of one or more polyols the molecular weight of which is between 300 and 6000 with a polyisocyanate in excess, the said liquid prepolymer simultaneously containing polyester and polyether linkages and optionally a solvent, the ratio NCO/OH corresponding to the prepolymer composition, and the ratios $NH_2$/OH and NCO/OH + $NH_2$ corresponding to the coating composition, being within the aforesaid limits.

It will be noted that among the diamines which can be chosen according to the invention, in addition to the aromatic diamines already mentioned, such as benzidine, dichlorobenzidine, methylenedianiline, 3-3′ dichloro 4-4′ diaminodiphenylmethane, o-anisidine, 3,3′ dimethyl 4-4′ diaminodiphenylmethane, phenylene diamines, etc., cycloaliphatic diamines such as the preceding ones the aromatic ring of which has been hydrogenated, and aliphatic diamines and mixtures thereof are also suitable. Dihydrazides and derivatives thereof, preferably mixed with the aforesaid diamines can also be used. Amino-alcohols, on the other hand, most often give disappointing results owing to the great difference in reactivity between the $NH_2$ group and the OH group. The composition of the present invention therefore provides a much greater choice of diamines.

Solvents for dissolving the diamine are: ketones such as acetone, methyl-ethylketone, methyl isobutylketone, cyclohexanone, esters such as methyl-, ethyl-, butyl-, methylglycol- or ethylglycol acetates, chlorinated hydrocarbons such as methylene chloride, dichloroethane.

For the preparation of the liquid prepolymer there will advantageously be used a polyether polyester polyol, that is to say a compound comprising at least two hydroxyl functions and containing both polyether and polyester linkages. Copolymers obtained by transesterification of a polyester and polyether, described for example in French Pat. No. 2,019,483 may be used. Said patent is introduced into the present specification as a reference. Finally, the products obtained by the condensation of an alkylene oxide such as ethylene oxide or propylene oxide on a polyester-polyol are also suitable.

The liquid prepolymer may be obtained by reacting the mixture of a polyether polyol and a polyester polyol with a polyisocyanate. It can, again, be a liquid mixture of a prepolymer obtained with a polyether polyol and a prepolymer obtained with a polyester polyol.

As polyether polyols, compounds will be used having at least two OH functions such as polyoxyalkyleneglycols, wherein the alkyl group is an ethyl, propyl or butyl group, or the addition products of ethylene- and/or propylene- and/or butylene oxides on polyols having at least two hydroxyl functions, such as glycols, trimethylolpropane, glycerine, hexanetriol, pentaerythritol.

As polyester-polyols compounds will be used obtained by esterification of carboxylic polyacids by polyols. By carboxylic polyacids, polyacids such as succinic, glutaric, adipic, phthalic, terephthalic, isophtalic, sebacic, pimelic acids, etc., are meant. Typical polyols are glycols such as ethylene-,propylene-, butylene-glycol, or polyether-polyols such as those mentioned above.

Lactonic polyesters known for their good behaviour in hydrolysis and obtained by condensation of one or more lactones (the ring of which comprises at least 6 carbon atoms) with a polyfunctional initiator having several reaction sites capable of inducing opening of the lactonic ring will also be used advantageously. In particular, copolymers of lactone and ethylene-glycol adipate which are liquid at normal temperature may be chosen. Said products are described, for example, in French Pat. No. 2,015,687.

The polyisocyanates used for the preparation of the prepolymers are organic such as aromatic, cycloaliphatic or aliphatic. There will preferably be used common diisocyanates available on the market such as toluene diisocyanate, the mixture of their isomers, diphenylmethane diisocyanate, dicyclohexylmethane diisocyanate, hexamethylene diisocyanate, isophorone diisocyanate, etc.

It was completely unexpected to find that the use of a mixture of prepolymers prepared, on the one hand, by the reaction of a polyether polyol with a polyisocyanate, on the other hand, by reaction of a polyester polyol with a polyisocyanate, or a single prepolymer prepared by the reaction of a mixture of a polyether polyol and a polyester polyol with a polyisocyanate, or of a single prepolymer prepared by reaction of a polyol containing simultaneously polyester and polyether linkages with a polyisocyanate would retain the advantages of each of these materials used alone without adding drawbacks.

In the case where a mixture of two prepolymers is used, one obtained from a polyether polyol, the other from a polyester polyol or when the prepolymer is obtained directly from a mixture of polyether polyol and polyester polyol, it is preferable to obtain a homogenous liquid which, when used for spraying, does not separate into two phases. A low level of non-miscibility can be tolerated on condition that spraying is fairly fine and that the sprayer is supplied with a mixture which does not decant and retains a constant composition. To ensure the homogeneity of the prepolymer mixture, that is to say complete or practically complete miscibility of the two prepolymers, their temperature may be raised by heating to a temperature of at most 120°–130° C. It is also possible to introduce a limited amount of solvent and combine the addition of a solvent and raising of the temperature. The relative amounts of prepolymer comprising polyether polyol and prepolymer comprising polyester polyol, or the relative amounts of polyether polyol and polyester polyol to be used are obviously variable within broad limits. They should be determined as a function of a nature of said compounds, the mechanical properties desired, their reciprocal miscibility, etc. Generally speaking it may be said that the weight ratio of polyether polyol to polyester polyol should be between 1/9 and 9/1.

Whether a mixture of prepolymers or a single prepolymer is used it is essential that this liquid complies with the conditions required for spraying, that is to say that its viscosity should not be too high and lie within the range of 4000 to 20,000 cps at 25° C. For higher viscosities it is necessary to add a solvent, but this should always be introduced in limited amounts, in order not to come up against the previously mentioned difficulties. In general, the weight of the solvent based on the weight of the prepolymer will be lower than about 30 %.

The solvents suitable can be the same as or different from those used to dissolve the amine; they should be chemically inert with respect to the prepolymer and, in particular, they should be anhydrous.

The viscosity of the prepolymer when it arrives in the spraying nozzle will be between 100 and 1000 cps. It may exceed these values and be as high as 2000 cps with certain spray guns permitting large outputs and using a spraying air pressure of up to 6 kg/cm² or more. Said viscosities are obtained by reheating the prepolymer or by addition of solvent or by both these means simultaneously.

The gelling of the sprayed mixture starts as soon as it is applied to the support. Owing to the reactivity of its constituents gelling takes place without a catalyst and equally well on a support at 20°C as on a support at a temperature which may be as high as 120°C.

A particular feature of the composition of the invention is that it does not require baking. This may, however, be effected between 50° and 120° for 15 minutes if, for example, it is desired to withdraw the elastomer film from a mould. But if spraying is effected on a large surface, or if for any reason it is impossible to heat the support, the coating will acquire excellent mechanical properties after a few hours. It will be dry to the touch, even in the cold state, after a few minutes.

Pigments and dyes, whether or not formed into a paste with a plasticizer or solvent, may be added preferably to the diamine solution but if they are inert or anhydrous they may be mixed with the prepolymer or else partly with one and partly with the other.

When a composition according to the invention is applyed by spraying a film is obtained the thickness of which can range from a few tenths of a millimeter to several centimeters, and having good mechanical properties.

This invention also relates to objects covered with an adhering film obtained from a composition of this type and of low cost price, said objects being hard or flexible, compact or cellular; the film may for example make such objects fluid-tight or protect them against abrasion, chemical agents or atmospheric agents. It may in addition provide electrical insulation and improve the appearance of any finished articles.

In particular, the invention makes it possible to obtain pigmented or coloured surfaces providing not only protection but also decoration for objects or surfaces.

The following examples are intended to show the improvement of the mechanical properties of a coating, resulting from the use of a polyether-polyol - polyester polyol mixture instead of a polyether polyol. They are in no way limitative in character.

In all the following examples a 40 % by weight solution of methylenedianiline in methylethylketone is used as the diamine component.

The machine used had two pots, one for the prepolymer the other for the diamine in solution in the solvent. Each pot was connected to a spray gun with an intermediately positioned geared pump for proportioning the components. The prepolymer side could be maintained at a temperature of 20° to 120°C both in the pot and the pipes supplying the gun.

The external mixture type spray gun provided even spraying in a mould (polyethylene or silicone rubber film).

In all the examples described the ratio NCO/OH + $NH_2$ = 1.05.

EXAMPLE 1

The following were prepared:

a prepolymer A from a triol having a molecular weight of 2500 obtained by the oxypropylation of trimethylolpropane, which was reacted for 5 hours at 75°C with toluene diisocyanate to obtain a ratio NCO/OH = 2. After 48 hours said prepolymer had 1.1 NCO function per kg.

a prepolymer B from a polycaprolactone homopolymer of a molecular weight of 2000 and toluene diisocyanate in the ratio NCO/OH = 2 by baking at 80°C for 5 hours. This prepolymer had 0,81 NCO function per kg.

| | |
|---|---|
| Trial 1 | |
| 100 g A | |
| 100 g B | component maintained at 90°C |
| 80 g ethylglycol acetate | |
| Trial 2 | |
| 100 g A | |
| 100 g B | component maintained at 65°C |
| 25 g dimethyl formamide | |

With both these trials the final properties of the film, whether baked or not, are substantially identical.

| Prepolymers | A Polyether | A + B polyether + polyester |
|---|---|---|
| Breaking load (kg/cm²) | 32 | 79 |
| Elongation at break (%) | 160 | 480 |
| Elastic recovery 3 mn % | 100 | 98 |
| Resistance to tearing(kg/cm) | 22 | 33 |
| Trial 3 | | |
| 300 g A | | |
| 100 g B | | component maintained at 70°C |
| 20 g methylethylketone | | |
| Trial 4 | | |
| 300 g A | | |
| 100 g B | | component maintained at 24°C |
| 140 g methylethylketone | | |

The mechanical properties are identical for the trials 3 and 4.

| Prepolymers | A Polyether | 3A + 1B polyether + polyester |
|---|---|---|
| Breaking load (kg/cm²) | 32 | 48 |
| Elongation at break (%) | 160 | 290 |
| Elastic recovery 3mn % | 100 | 100 |
| Resistance to tearing (kg/cm) | 22 | 26 |

EXAMPLE II

The PE III prepolymer described in French Pat. No. 1.427.722 was used.

The PE III prepolymer was prepared from a mixture of 5.528 kg of a propylene glycol of a mean molecular weight of 2000 designated by the abbreviation P2010 and 472 g of polypropylene glycol of a mean molecular weight of 400 designated by the abbreviation P 410. This dehydrated mixture was brought to 80° ± 2°. 1920 kg TDI was added with good agitation and while maintaining this temperature. Heating was then effected at 95°C for 2 hours.

The PE III prepolymer had 1,75 NCO function per kg. 50 parts of a prepolymer, obtained by baking 1000 g of a polycaprolactone diol of a molecular weight of 2000 and 232 g of toluene diisocyanate at 80°C for 3 hours, is added to 100 parts of PE III prepolymer.

Eight hours after spraying, the mechanical properties of the films obtained were measured:

| Prepolymers | PE III | PE III + prepolymer comprising polycaprolactone |
|---|---|---|
| Breaking load ($kg/cm^2$) | 300 | 345 |
| Elongation at break (%) | 375 | 520 |
| Resistance to tearing (kg/cm) | 135 | 105 |

EXAMPLE III

A prepolymer was prepared from 1000 g of a triol obtained by oxypropylation of trimethylolpropane having a molecular weight of 2500, 300 g of a polycaprolactone diol having a molecular weight of 840 (the mixture of said polyols is homogenous at 30°C) and 335 g of toluene diisocyanate. After baking for 3 hours at 85°C, the isocyanate content is 1.15 NCO function per kg. The prepolymer is homogenous at 30°C.

Said prepolymer was used for spraying under the usual conditions defined hereinabove.

To obtain an intimate mixture with the diamine in the solvent medium it was necessary to raise the temperature of the prepolymer at the gun inlet to 105°C. The mechanical properties of the films obtained by spraying are excellent.

EXAMPLE IV 1000 g of a ethylene glycol polyadipate having a molecular weight of 2000, 100 g of a diol obtained by oxypropylation of ethylene glycol having a molecular weight of 400, and 261 g of toluene diisocyanate, heated at 80°C for 3 hours were used to prepare a prepolymer. The prepolymer homogenous at 60°C had 1.1 NCO function per kg.

10 g of dimethylformamide is added to 100 g of prepolymer.

Spraying is effected under normal conditions, but heating the prepolymer to 90°C. The films obtained by spraying have excellent mechanical properties after baking at 80°C for 30 min.

Equivalent results are obtained if, in the preceding examples, the methylenedianiline is replaced by another aliphatic or cycloaliphatic diamine, optionally mixed with an aromatic diamine.

I claim:

1. A method for forming a film of polyurethane-polyurea on a support comprising spraying said support with a two component composition mixed at the time of spraying consisting as first component a solution of at least one organic diamine in a solvent and as a second component a prepolymer liquid at prepolymer spray temperatures of 20° to 130°C containing both polyether and polyester linkages in a ratio of 9:1 to 1:9 and prepared by reacting at least one polyol with a molecular weight of 300 to 6000 and an organic polyisocyanate with a ratio of NCO/OH between about 1.5 and 3 and recovering the support with a polyurethane-polyurea coating, said second component containing from 0 up to 30% of a solvent and having a viscosity of 2000 cps or less at the prepolymer spray temperature, the proportions of the first and second components being such that the ratio of $NH_2/OH$ is greater than 0.5 and the ratio of $NCO/OH + NH_2$ is between 0.95 and 1.6.

2. The method of claim 1 wherein the prepolymer is at a temperature of 20° to 120°C at the time of spraying.

3. The method of claim 1 wherein the diamine is selected from the group consisting of aromatic, cycloaliphatic and aliphatic diamines and mixtures thereof.

4. The method of claim 1 wherein the polyol has at least two OH groups and contains in the molecule polyether and polyester linkages.

5. The method of claim 1 wherein the prepolymer is prepared by reacting a mixture of polyether polyol and a polyester polyol and said organic polyisocyanate.

6. An article coated with a polyurethane-polyurea coating produced by the method of claim 1.

* * * * *